United States Patent [19]

Felson

[11] Patent Number: 5,068,957

[45] Date of Patent: Dec. 3, 1991

[54] TURNING VANE SETTING TOOL

[76] Inventor: Raymond M. Felson, 56 Rugby Place, Montreal West, Quebec H4X 1C4, Canada

[21] Appl. No.: 623,764

[22] Filed: Dec. 7, 1990

[30] Foreign Application Priority Data

Sep. 25, 1990 [CA] Canada .................. 2026100

[51] Int. Cl.⁵ ............................. B21D 28/00
[52] U.S. Cl. ................... 29/566; 29/283.5; 29/513; 72/325
[58] Field of Search ............ 29/33 K, 566, 21.1, 29/437, 438, 509, 513, 727, 283.5, 281.6; 72/325; 81/485

[56] References Cited

U.S. PATENT DOCUMENTS 3,190,250  6/1965  Hinden .................. 29/513
4,404,835  9/1983  Frith ..................... 72/325
4,467,829  8/1984  Myers .................... 137/561
4,586,540  5/1986  DeLord .................. 29/513 X

FOREIGN PATENT DOCUMENTS 601392  7/1960  Canada .................. 29/513
 67804  1/1915  Switzerland ............ 29/513

Primary Examiner—William Briggs

[57] ABSTRACT

A device and method are provided for permeanently anchoring air turning vanes to manufactured vane rails or runners in ductwork systems and which incorporate pre-positioning, splitting and bending means into one continuous sequence when the device is applied to the exposed edge of an air turnign vane which has been inserted into the slotted depression of manufactured vane rails or runnes and is actuated by means of a hammer blow or similar energy source.

1 Claim, 2 Drawing Sheets

TURNING VANE SETTING TOOL

This invention relates to a device and a method for using it when one wishes to permanently secure air turning vanes to commercially available vane rails or runners which, when assembled together, form air turning vane assemblies which are used in ductwork systems in large buildings. Air turning vane assemblies, when installed into the square elbows of sheet metal ducts, serve to guide the flow of air around bends which are usually 90 degrees. There are several systems in use at the present time and this invention is directed to a simple system which has been in use for many years and relates to single vanes which are thin pieces of sheet metal formed into 90 degree arcs of a circle, the radius of which is usually 4 inches. The vanes are set into rail which is manufactured from light gauge steel strip approximately 4 inches in width and is supplied in coiled lengths. The rail is pierced and formed on punch presses so as to create circular or nearly circular depressions which each contain a single pierced slot into which the edge of a turning vane is inserted and subsequently secured in place.

Before the advent of manufactured vane rails standard shop procedure was to cut and form individual vanes and provide tabs cut into each end for attachment, one by one, to the interior faces of an elbow. This was time consuming and often erratic, fully dependent upon the skills of the sheet metal worker. The introduction of manufactured rail allowed less skilled workers to fabricate turning vane assemblies outside of the confines of the duct and, when completed, to install them as single units into each elbow using only a few sheet metal screws or rivets to hold the assembly in place. While this was a considerable advancement in the art, other problems were created.

One problem to be solved was to devise a practical method for fastening each turning vane into the slots of the rail so that the vane could not work loose when subjected to the air pressures exerted against the vanes by rapid air movement through the system because, once the ductwork is in place, it is impractical to gain access to the interior of the duct to effect repairs. Therefore reliability of method is essential during the fabricating process.

When the edge of a turning vane is inserted into the pierced slot of manufactured rail a portion of the vane edge projects above the surface of the depression in the rail, providing a practical means for fastening the vane in place. There have been several methods used in the past to accomplish this. Most have been clumsy and relatively ineffective. When improperly secured into place the vanes eventually work loose and are unable to perform their function.

One generally accepted method for fastening is to split the edge of the protruding portion of a turning vane at an acute angle to the plane of the vane and to bend over the freed ends on opposing directions, thereby creating a positive locking method which cannot easily work loose. Shop practice utilizes a cold chisel, the cutting edge of which is specially ground to an included angle of approximately 60 degrees. The procedure is rather clumsy and can be described as follows: A portion of vane rail is positioned over the vane edge so that the vane edge enters the rail slot wholly contained within the depression of the rail and projects above it. A light hammer blow seats the vane edge into the slot. With the rail portion held firmly in place using pressure from the heel of one hand the chisel is positioned at the approximate center of the exposed portion of the vane edge and at an acute angle to it. A hammer blow splits the vane edge forcing the now freed ends of the split over in opposing directions. While the result can be satisfactory the procedure is awkward to perform, especially on a repetitive basis. For example, when the chisel is held in place the heel of the hand obscures the worker's view. It is almost impossible to get consistently good results.

It is therefore an object of the invention to provide a device and a method for using it which will perform the same operations as have just been described in the previous paragraph, but with accuracy, simplicity and consistency.

The device provides means for positioning itself into the depression of the vane rail while, at the same time, preventing any lateral movement within that depression.

The device provides means for applying pressure to hold the portion of vane rail firmly in position against the turning vane edge while allowing the exposed portion of vane edge to project above the depression of the rail.

The device provides means for pre-positioning a cutting edge contained within the body of the device so that the cutting edge is poised directly above the turning vane edge at a precisely predetermined acute angle to the plane of the vane and maintains that acute angle during actuation of the device.

The device provides means for splitting the exposed portion of the turning vane edge and for bending over the freed ends in opposing directions, thereby providing a positive locking means.

The device provides means for performing all of the previously mentioned operations in one smooth and uninterrupted sequence, with the use of only one hand, leaving the other hand free to hold and use a hammer which is required to actuate the device.

One embodiment of the invention will now be described by way of example, with reference to the accompanying drawings of which:

Figure 6:
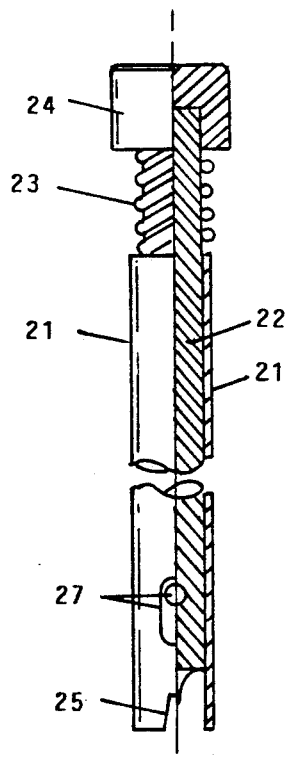
FIG. 6 shows an elevation of the device and a partial sectional view of the components, the device being in the retracted position.
Figure 7:
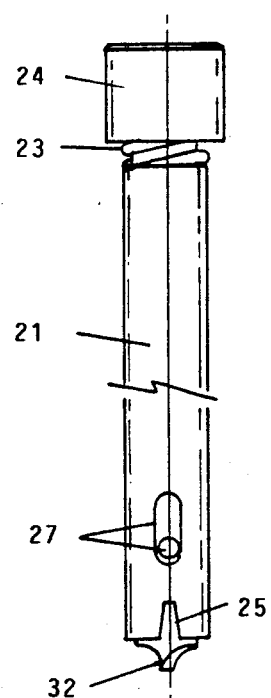
FIG. 7 is an elevation of the device in the extended or operating mode.

As shown in FIGS. 6 and 7 the device consists of three basic components, a hollow tubular outer casing 21, a solid inner shaft with a chisel-like cutting edge 22 and a compression spring 23. The dimensions of the device are governed by the requirement that it be hand held and comfortable and convenient to use. FIG. 7 illustrates the device with inner shaft 22 in its fully extended, operating position. The solid inner shaft slides freely within its outer casing in a linear motion and is prevented from rotating within the casing by means of a slot and pin arrangement 27. Referring further to FIGS. 6 and 7 it should be noted that, where two (2) slots are indicated in the drawings and which penetrate through both walls of the outer casing 21, and a cross-drilled hole through the inner shaft 22 accomodates a pin or rivet in order to prevent rotation and to limit the travel of the inner shaft within the outer casing, this arrangement can be reversed so that the casing is cross-drilled and the shaft slotted, allowing for identical sliding and stroke-limiting means in each case.

There is a hardened steel cap 24 at one end of the inner shaft 22 to which it is permanently secured. The cap is of greater diameter than that of the shaft's main body. It acts as both a seating means to hold the compression spring 23 in place and as a means for surviving repeated hammer blows when the device is in continuous use.

Figure 9:
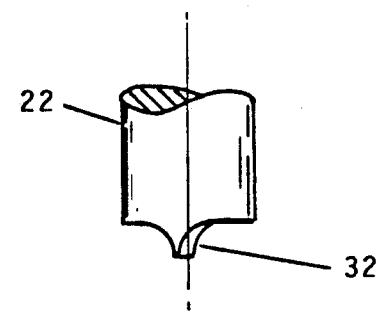
FIG. 9 illustrates a configuration of the cutting edge of the blade and which forms a part of the inner shaft of the device.

The inner shaft 22 has a modified chisel edge 32 at its opposite end which, when hardened, is capable of splitting the exposed edge of a turning vane. FIG. 9 illustrates a configuration that can split, bend over and lay flat the freed ends (tabs) of the vane edge at the split.

Figure 1:
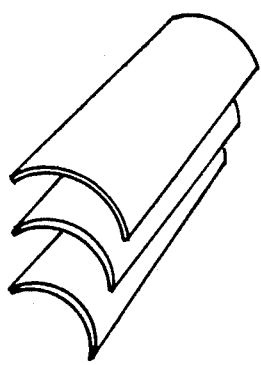
FIG. 1 is a perspective view of three single turning vanes as used in the most commonly encountered system.
Figure 2:
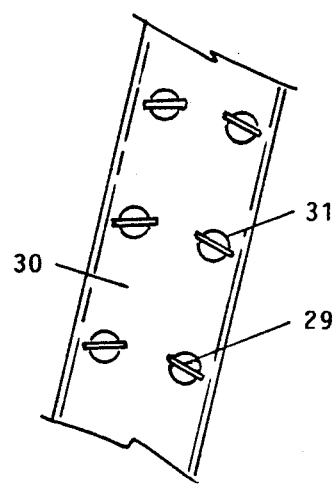
FIG. 2 shows a typical portion of manufactured vane rail or runner which is used with single turning vanes and which has slots contained within circular depressions.
Figure 3:
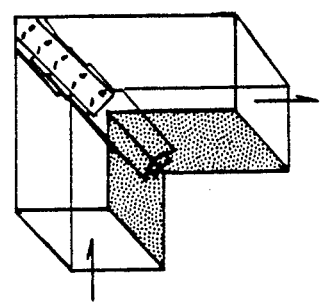
FIG. 3 is a cutaway view of a typical air turning vane assembly located within the diagonal of a square duct elbow.
Figure 4:
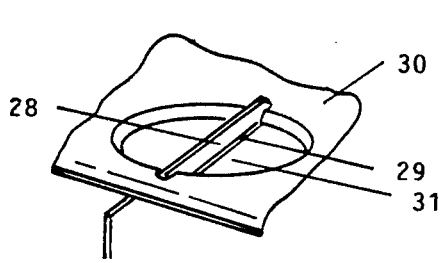
FIG. 4 shows an exposed turning vane edge projecting through and above a slot in the vane rail depression.
Figure 8:
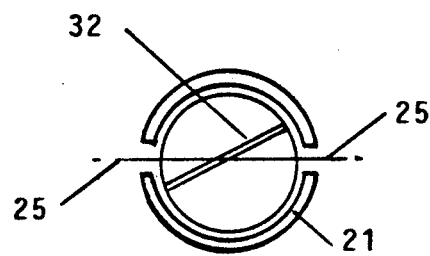
FIG. 8 is a bottom view of the device showing the cutting blade contained within the outer casing.

Referring to FIGS. 6, 7 and 8 the outer casing 21 has two (2) V-shaped notches cut into the casing at one end and which are positioned at 180 degrees to each other. The notches are intended to straddle the exposed van edge 28 when the device is inserted into the depression 31 of the vane rail 30 as shown in FIG. 4, and serve to preposition the cutting edge 32 of the device before actuation. The V-notches also provide means for accomodating the projecting edge of the turning vane when the outer casing is used to apply holding pressure to the perimeter of the rail depression 31 in order to firmly seat the rail against the vane edge.

Figure 5:
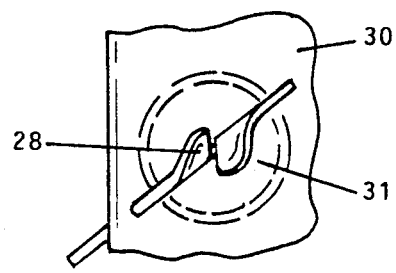
FIG. 5 illustrates a turning vane edge which projects through a vane rail slot and has been secured into place by the device.

The stroke of the shaft 22 within the casing 21 is quite short, being about one-half inch. The position of the shaft within and relative to the casing is of great importance in both the retracted and extended modes. The plane of the chisel edge must be maintained at an angle of 20 to 35 degrees to that of the two V-slots in the casing in order that it be able to split, part and then bend over the freed ends of the turning vane edge 28 in opposing directions, as shown in FIG. 5. When the device is inserted into the rail depression 31 and straddles the vane edge 28, the shaft 22 is retracted as shown in FIG. 6 and the cutting edge of the shaft must clear the exposed vane edge and not be in contact with it. When a hammer blow actuates the device the shaft's chisel edge extends beyond the face of the outer casing as illustrated in FIG. 7 so that it splits, parts and bends over the vane edge but does not deform the depression of the rail, which would result in excessively spreading apart the slot 29.

The compression spring 23 causes the shaft to retract into the casing after actuation. It's compressive force is just sufficient to cause this retraction. The inside diameter of the spring allows free sliding action along the shaft. The spring is seated against one face of the casing, the opposite end being seated against the underside of the shaft cap 24 as shown in FIG. 6.

Figure 10:
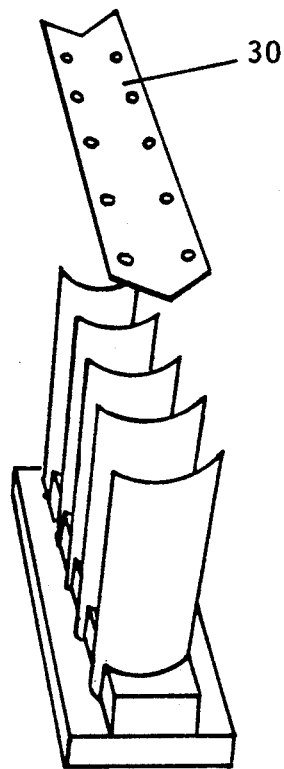
FIG. 10 illustrates an assembly jig which can be used with the device, with single turning vanes installed in a vertical position in preparation for assembly.
Figure 11:
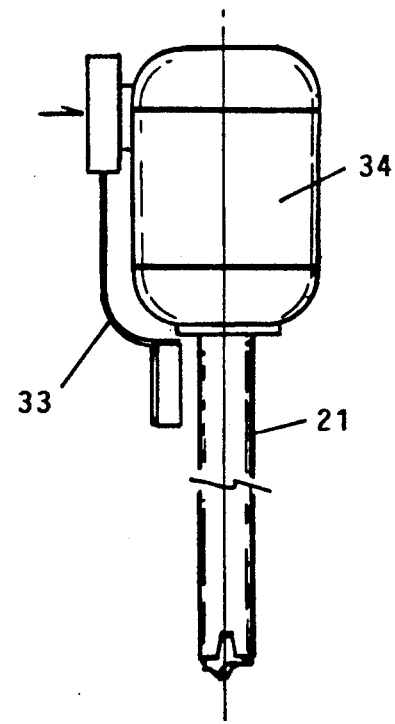
FIG. 11 is an elevation of the device to which an air-operated cylinder and activating valve have been coupled.

Recommended operating sequence is as follows: place turning vanes vertically into a positioning jig as shown in FIG. 10. Cut strips of vane rail 30 from the coil and straighten them. Apply one rail strip across the top of the vanes, aligning vane edges with the rail slots 29. Insert vane edge 28 into the two slots of the rail and tap the rail until the vane is fully seated, as shown in FIG. 4. Insert the device into the rail depression 31 allowing the V-notches to straddle the exposed vane edge 28. Apply firm hand pressure vertically to the outer casing 21 so that the exposed portion of the vane edge projects fully above the depression of the rail. Apply a hammer blow to the shaft cap. Repeat until all top vanes have been secured. Remove the partial assembly from the jig, turn it over and repeat procedure, but remote from the jig, until all vanes have been secured.

Where volume production of air turning vane assemblies warrants, an air-actuated cylinder 34, as shown in FIG. 11, can be coupled to the device in a manner such that the air cylinder casing attaches to the device's outer casing 21 and the air cylinder's shaft attaches to the shaft of the device. The air cylinder should be single acting with spring return, eliminating the need for a spring 23. The cylinder can be actuated by a lever 33 positioned conveniently so that it can be operated by thumb or forefinger.

There are other obvious configurations for the design of the setting tool and what has been described is but one. For example the shaft 22 may have more than one cutting edge 32 so that multiple splitting action is made available while still containing the shaft within its outer casing.

Persons experienced in the art will readily recognize that the device and procedure can be used with equal success on "hollow" (double) vanes, whereas the description has only considered "single" vanes.

Other embodiments of the invention will also be apparent, the scope of the invention being defined in appended claims.

What I claim as new and desire to protect by Letters Patent of the United States is:

1. A tool for installing air turning vanes in air turning vane rails or runners having circular or near circular embossed depressions with slots thereacross that receive an end of the air turning vane, said tool comprising a cutting shaft having a cutting and deforming chisel edge at a first edge at a first end thereof, said shaft being received for linear movement in a cylindrical or near cylindrical casing which conforms and fits into the circular or near circular depressions of the vane rail or runner, said casing and shaft having cooperating means insuring said linear movement, said casing having a first end with diametrically opposed notches therein that receive the vane edge for positioning, said chisel edge being disposed at an acute angle relative to the diameter or to the major axis that said notches lie upon; said shaft having a second end extending out of the second end of said cylindrical or near cylindrical casing so that the chisel edge of said shaft may be driven into a vane edge to form tabs that lock said vane to said rail or runner.

* * * * *